United States Patent [19]

Stonehart

[11] 4,407,906
[45] Oct. 4, 1983

[54] FUEL CELL WITH PT/PD ELECTROCATALYST ELECTRODE

[75] Inventor: Paul Stonehart, Madison, Conn.,

[73] Assignee: The United States of America as represented by the U.S. Department of Energy, Washington, D.C.

[21] Appl. No.: 317,818

[22] Filed: Nov. 3, 1981

[51] Int. Cl.³ .............................................. H01M 4/86
[52] U.S. Cl. ........................................ 429/42; 429/44
[58] Field of Search ............................ 429/44, 42, 40; 427/115, 125; 252/182.1

[56] References Cited

U.S. PATENT DOCUMENTS

| | | | |
|---|---|---|---|
| 3,212,930 | 10/1965 | Thompson et al. | 429/42 X |
| 3,261,717 | 7/1966 | Shropshire et al. | 136/86 |
| 3,510,355 | 5/1970 | Fishman | 136/86 |
| 3,510,356 | 5/1970 | Richman | 136/86 |
| 3,932,197 | 1/1976 | Katz et al. | 429/44 |
| 4,163,811 | 8/1979 | Kohlmayr | 429/42 X |
| 4,185,131 | 1/1980 | Goller et al. | 429/42 X |
| 4,185,145 | 1/1980 | Breault | 429/44 X |

OTHER PUBLICATIONS

Kinoshita et al., *Electrocatalysis on Binary Alloys*; J. Electro-Analytical Chem., vol. 63 (1975) pp. 97–110.
Kinoshita et al., *Electrocatalysis on Binary Alloys*, Electro-Analytical Chem. & Interfacid Electrochem. vol. 59 (1975) pp. 177–189.

*Primary Examiner*—Charles F. LeFevour
*Attorney, Agent, or Firm*—Michael F. Esposito; Richard G. Besha

[57] ABSTRACT

An electrode for use in a phosphoric acid fuel cell comprising a graphitized or partially graphitized carbon support having a platinum/palladium electrocatalyst thereon. Preferably, the platinum/palladium catalyst comprises 20 to 65 weight percent palladium.

10 Claims, 4 Drawing Figures

COMPARISON OF ANODE ELECTRODE PERFORMANCES AT 180°C IN 100% $H_3PO_4$ ON 10% CARBON MONOXIDE 90% HYDROGEN AT 200mA/cm² AS A FUNCTION OF CATALYST COST RATIOED TO THE COST OF 0.5 mg Pt/cm² Pt VULCAN XC-72R.

COMPARISON OF ANODE ELECTRODE PERFORMANCES AT 180°C IN 100% $H_3PO_4$ ON 10% CARBON MONOXIDE 90% HYDROGEN AT 200 mA/cm$^2$ AS A FUNCTION OF CATALYST COST RATIOED TO THE COST OF 0.5 mg Pt/cm$^2$ Pt VULCAN XC-72R.

ANODE PERFORMANCES FOR 0.5mg Pt ON VULCAN (SQUARES) AND 0.3mg PGM ON CARBON (CIRCLES). NOMINAL 90% $H_2$ + 10% CO. 180°C AND 100% $H_3PO_4$.

ANODE PERFORMANCES FOR 0.5mg Pt ON VULCAN (SQUARES) AND 0.3mg PGM ON CARBON (CIRCLES). NOMINAL 70% $H_2$ + 30% CO. 180°C AND 100% $H_3PO_4$.

ANODE POLARIZATION AT 200 mA/cm² AS A FUNCTION OF a/o PLATINUM FOR VARIOUS FUEL GASES. THE CATALYST IS 4% PGM/CONSEL I AND WAS FABRICATED INTO GAS DIFFUSION ELECTRODES (30% PTFE) WITH A LOADING OF 0.2 mg PGM/cm². THESE DATA WERE OBTAINED AT 180°C IN 100% $H_3PO_4$. OPEN SYMBOLS FOR CATALYSTS HEAT TREATED TO 700°C. SOLID SYMBOLS FOR STANDARD 4% PT/CONSEL I CATALYST.

FUEL CELL WITH PT/PD ELECTROCATALYST ELECTRODE

This invention relates to improved electrochemical cells and to novel electrodes for use therein. In particular, the present invention comprises a fuel cell used primarily for the consumption of impure hydrogen fuels containing carbon monoxide or carbonaceous fuels where the electrode in contact with the fuel is not substantially poisoned by carbon monoxide. The anode of the fuel cell comprises a Pd/Pt alloy supported on a graphitized or partially graphitized carbon material. The U.S. Government has rights in this invention pursuant to Contract No. DEN-3-176 between NASA and Stonehart Associates.

Fuel cells which comprise as essential elements a fuel electrode, an oxidizing electrode, and an electrolyte between said electrodes are devices for the direct production of electricity through the electrochemical combustion of a fuel and oxidant. These devices are recognized for their high efficiency as energy conversion units, since unlike conventional combustion engines, they are not subject to the limitations of the Carnot heat cycle.

The present development of fuel cells, hydrogen-oxygen systems are in the production-engineering stage, primarily for space applications. The logistic and economic requirements, however, of military and commercial applications necessitate operation on carbonaceous fuels, or on impure hydrogen obtained from the reforming of carbonaceous fuels. Unfortunately, while the carbonaceous fuels are theoretically consumable in fuel cells, difficulties are encountered in direct carbonaceous fuel consumption as a result of the inefficiencies of the electrochemical process at the anode and a progressive poisoning of the catalytic surface of the anode due to by-products of the anode reaction which may include carbon monoxide. Moreover, since carbon dioxide is one of the procucts of the electrochemical reaction, sparingly soluble carbonates will be produced in an alkaline electrolyte, consuming the electrolyte and congesting the system. Thus, it is necessary to employ acid electrolytes.

In view of the difficulties encountered with direct conversion of carbonaceous materials, the suggestion has been made to break down the carbonaceous material in a chemical reformer and feed the reformed product which is primarily hydrogen directly to the fuel cell anode. It is the common experience that the reform product contains a minor proportion of carbon monoxide. It is a further experience that the feeding of the impure hydrogen stream containing the carbon monoxide to the catalytic surface of the electrode causes progressive poisoning and consequent deterioration of the electrochemical performance of the cell. It has been necessary, therefore, either to carefully purify the hydrogen stream obtained from the reformer prior to its passage to the anode to obtain a reasonable lifetime for the cell anode or to design the fuel electrocatalyst to be tolerant to the carbon monoxide. In addition to the need to have more ancillary equipment, purification units are generally operated at high temperatures and pressures, rendering the expediency undesirable.

U.S. Pat. No. 3,510,355 to Fishman proposes to alleviate the problems associated with this solution by using a palladium/gold alloy as the anode in the cell. Fishman discloses that the palladium/gold alloy is resistant, or substantially resistant, to carbon monoxide poisoning; is not corroded by acid electrolyte; and in the event a carbonaceous fuel is used directly, is a good catalyst for electrochemical oxidation of the carbonaceous material. It should be noted that although the fuel contained only 0.7% carbon monoxide, Fishman claimed that an active electrocatalyst material was produced.

United Technology Corporation (UTC) has been developing an anode catalyst support for phosphoric acid fuel cells. UTC publications indicate that, at this time, the preferred anode catalyst support is Vulcan XC-72 (Cabot Corp.) which is a turbostatic highly disordered carbon made from residual fuel oil under the furnace black process. The accepted electrocatalyst on this carbon support material is Platinum. Applicants have catalyzed Vulcan XC-72R with palladium, which is a more abundant material, and found this electrocatalyst/carbon combination unstable under fuel cell anode operating conditions. It is readily apparent that although platinum catalysts are suitable for fuel cells, they are expensive. Accordingly, alternatives to platinum catalysts are highly desired. Of course, any alternative to platinum in order to be satisfactory should produce substantially the same performance results obtained with platinum.

U.S. Pat. No. 3,510,356 to Richman discloses Pd-Pt catalysts employed as electrodes in electrochemical cell. Richman, however, does not disclose that this alloy is suitable in a cell having impure hydrogen containing carbon monoxide as the fuel. In addition, Richman does not disclose a supported electrocatalyst, in particular, an electrocatalyst supported by graphitized or partially graphitized carbon.

As evidenced by the above discussion, the problem of developing an electrode for an electrochemical cell which operates under severe poisoning conditions (e.g., up to 10%-30% carbon monoxide) has not been solved. The present invention is directed to an electrode and electrochemical cell which substantially eliminates the poisoning problems involved in operating under these severe conditions.

SUMMARY OF THE INVENTION

It is the primary object of the present invention to provide an electrode having high electrochemical activity for an electrochemical cell.

It is another object of the present invention to provide an electrode having an electro-catalyst which is highly resistant to the corrosive environment of an electrochemical cell.

It is still another object of the present invention to provide an electrode which is highly resistant to poisoning by carbon monoxide.

It is a further object of the present invention to provide an electrochemical cell which operates efficiently with a fuel comprising impure hydrogen streams containing carbon monoxide.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the electrode of the present invention comprises a graphitized carbon support having on the surface an electrocatalytic material consisting essentially of a platinum-palladium alloy. The graphitized carbon support containing the Pt-Pd alloy may be supported on a porous electronic conductor.

In a preferred embodiment of the present invention the platinum-palladium alloy comprises from about 20–65 weight percent palladium.

In a further preferred embodiment of the present invention, the total metal loading on the catalyst support comprises about 1 to 15 weight percent of the catalyst. Most preferably, the total metal loading on the support comprises about 2–10 weight percent of the electrocatalyst material.

In a still further preferred embodiment of the present invention the total metal loading in the electrode is in the range of 0.1 to 0.5 mg/cm$^2$.

In another preferred embodiment of the present invention the electrode is composed of the electrocatalyst material together with a hydrophobic polymer in the range of about 25–60 weight percent. Most preferably, the hydrophobic polymer is selected to include polytetrafluoroethylene, and the polymer is present in the amount of about 40 weight percent.

In still another preferred embodiment of the present invention the metal to polymer ratio in the electrocatalyst material on the support is from about 0.1 to 10.0 weight percent.

In another aspect and in accordance with the purpose of the present invention as embodied and broadly described herein, the electrochemical cell comprises a pair of electrodes separated by an electrolyte wherein at least one of said electrodes comprises a graphitized or partially graphitized carbon support having on at least one surface an electrocatalytic material consisting essentially of a platinum-palladium alloy.

In a preferred embodiment of this aspect of the present invention the electrode material comprises a graphitized or partially graphitized carbon support having on at least one surface an electrocatalytic material consisting essentially of a platinum-palladium alloy having from about 20–65 weight percent palladium.

In a still further preferred embodiment of the present invention the total metal loading on the electrode support comprises about 1 to 15 weight percent of the catalyst. Most preferably, this range is from about 2 to 10 weight percent.

In another preferred embodiment of the electrochemical cell of present invention the metal loading in the electrode comprises from about 0.1 to 0.5 mg/cm$^2$.

The electrode and electrochemical cell of the present invention has significant advantages over the electrodes and cells disclosed by U.S. Pat. Nos. 3,510,355 and 3,510,356. The electrode and cell of the present invention exhibits dramatic improvement in comparison to the electrode and cell of U.S. Pat. No. 3,510,356 to Richman. The electrode of the present invention gives good results under severe operating conditions of as high as 30% carbon monoxide. In addition, these superior results are achieved at metal loading ranges which are far less than those disclosed by Richman.

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings.

DETAILED DESCRIPTION OF THE INVENTION

The support for the electrode of the present invention must be a graphitized or partially graphitized carbon. It has been discovered that this type of support unexpectedly facilitates the stability of the Pt/Pd alloy under fuel cell operating conditions. The degree of graphitization for the carbon support does not appear to be critical except that the c/2 lattice dimensions for the partially graphitized carbon should be below 3.55 angstroms.

The graphitized carbon used in the present invention is a steam activated acetylene back made by heating the acetylene black material in a steam atmosphere at temperatures above 800° C. This carbon is marketed by Stonehart Associates as Consel I. It shouldbe understood that this procedure is merely illustrative of various procedures for the formation of the graphitized or partially graphitized support used in the present invention.

The electrode of the present invention is prepared by conventional procedures illustrated by U.S. Pat. Nos. 3,992,331; 3,933,684; 4,044,193; 4,059,541 and 4,137,373, herein incorporated by reference. While the preferred process is the colloidal process illustrated by the aforementioned patents, the metal alloy may be deposited on the support by impregnation of a mixture of Pt and Pd salts, followed by reduction in $H_2$. See U.S. Pat. No. 3,510,355, herein incorporated by reference, for details of this procedure.

During the formation of the electrode of the present invention the total metal loading on the graphitized carbon support comprises about 1 to 15 weight percent of the catalyst. The preferred loading is between about 2 to 10 weight percent. The resulting fabricated electrode typically contains metal loading in the range of 0.1 to 0.5 mg/cm$^2$ with a metal to polymer binder ratio of 0.1 to 10.0 weight percent.

The polymer material comprises 25 to 60 weight percent of the resulting electrode structure, preferably 40 weight percent. Due to the extremely low metal loading of the catalyst, the metal to polymer ratio is significantly less for the electrode of the present invention in comparison to other electrodes. For example, the ratio of metal black to polymer disclosed in U.S. Pat. No. 3,510,356 is about 10.3. The metal to polymer ratio of the electrodes of the present invention is in the range of 0.1 to 10.0 weight percent.

The resulting graphitized carbon support electrode of the present invention is used in producing a novel electrochemical cell comprising a pair of electrodes separated by an electrolyte. At least one of these electrodes comprises a graphitized or partially graphitized carbon support having on the surface an electrocatalyst comprising a platinum/palladium alloy. Preferably, the platinum/palladium alloy comprises about 20–65% weight percent palladium. The electrochemical fuel cell is constructed by any conventional methods such as those described in U.S. Pat. Nos. 3,510,355 and 3,510,346 herein incorporated by reference.

Figure 1:
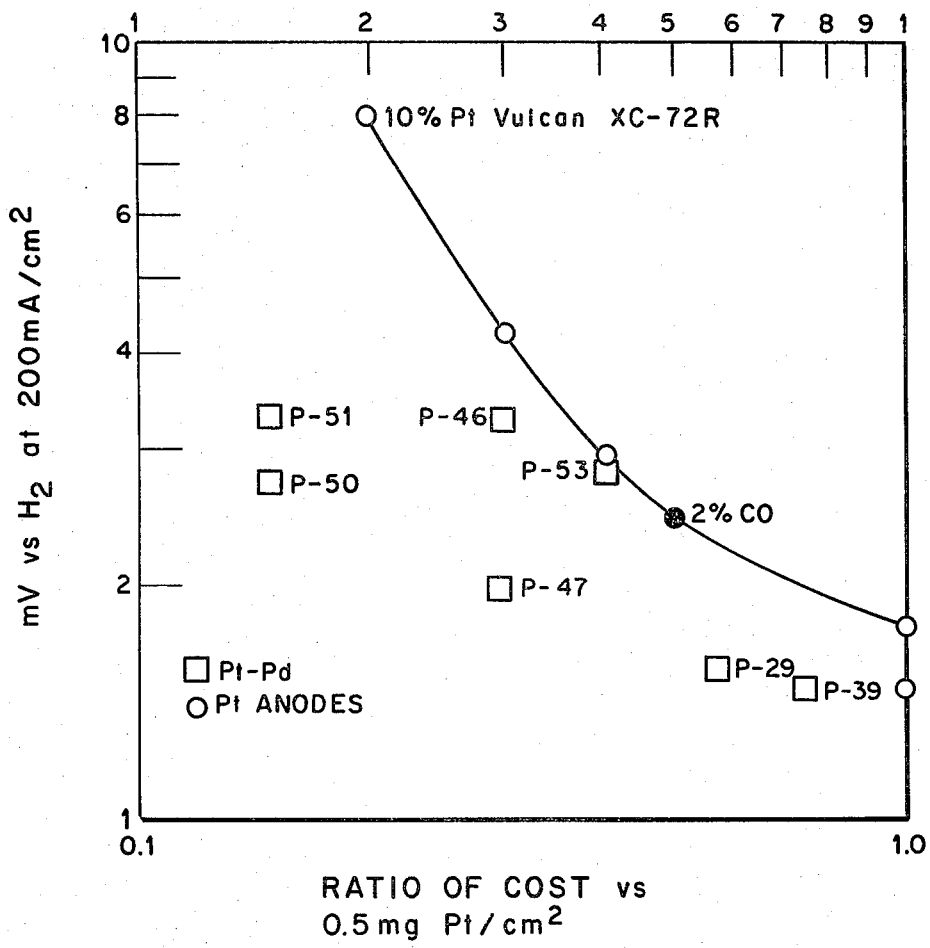
FIG. 1 is a plot diagram illustrating a comparison of anode electrode performance of the present invention at 180° C. in 100% $H_3PO_4$ on 10% CO, 90% hydrogen at 200 mA/cm$^2$ as a function of catalyst cost ratioed to the cost of 0.5 mgPt/cm$^2$ electrode.

The performance of the electrodes of the present invention in comparison to Pt supported electrodes is shown in the accompanying drawings. The solid line in FIG. 1 indicates the performance versus cost for a 10% Pt on conventional carbon support (i.e., Vulcan XC-72R) at various electrode loading. The performance is based on the polarization at 200 mA/cm$^2$ for a 10% CO/90% $H_2$ fuel. The dollar cost is normalized to the cost of a 0.5 mg Pt/cm$^2$ electrode. As a further point of reference, the commonly accepted performance value for 80% $H_2$, 2% CO, 18% $CO_2$ with 0.25 mg Pt/cm$^2$ at 180° C. is 25 mV polarization at 200 mA/cm$^2$. This point is shown as the solid datum in FIG. 1. It is clear that any electrocatalyst which falls below the line for the state-of-the-art 10% Pt on Vulcan XC-72R electrocatalyst will result in improving the performance and lowering the cost of the anode. All of the Pt/Pd alloys of the present invention operate in this region of lower cost, with the P-50 catalyst combination (2 weight percent loading 50/50 weight percent Pt/Pd) showing good results. Included in FIG. 1 is an electrocatalyst that is a ternary alloy of Pt, Pd and Au (P-53). Addition of the gold to Pt and Pd alloy electrocatalysts does not appear to be beneficial and appears to be detrimental since the performance is not better than platinum alone and not as good as platinum-palladium alone.

The electrodes tested and plotted in FIG. 1 are identified in Table I, below:

| Electrode Nos. | Wt % Pt in Metal Electrocatalyst Particle | Wt % Pd in Metal Electrocatalyst Particle | Wt % Au in Metal Electrocatalyst Particle | W/o Pt group Material (PGM) on Consel Support | PGM Loading on Electrode mg/cm$^2$ |
|---|---|---|---|---|---|
| P-29 | 45.6 | 54.4 | 0 | 12.7 | .31 |
| P-39 | 50 | 50 | 0 | 10 | .05 |
| P-46 | 50 | 50 | 0 | 10 | .02 |
| P-47 | 50 | 50 | 0 | 4 | .02 |
| P-50 | 50 | 50 | 0 | 2 | .02 |
| P-51 | 50 | 50 | 0 | 2 | .01 |
| P-53 | 25 | 50 | 25 | 5 | .25 |

Figure 2:
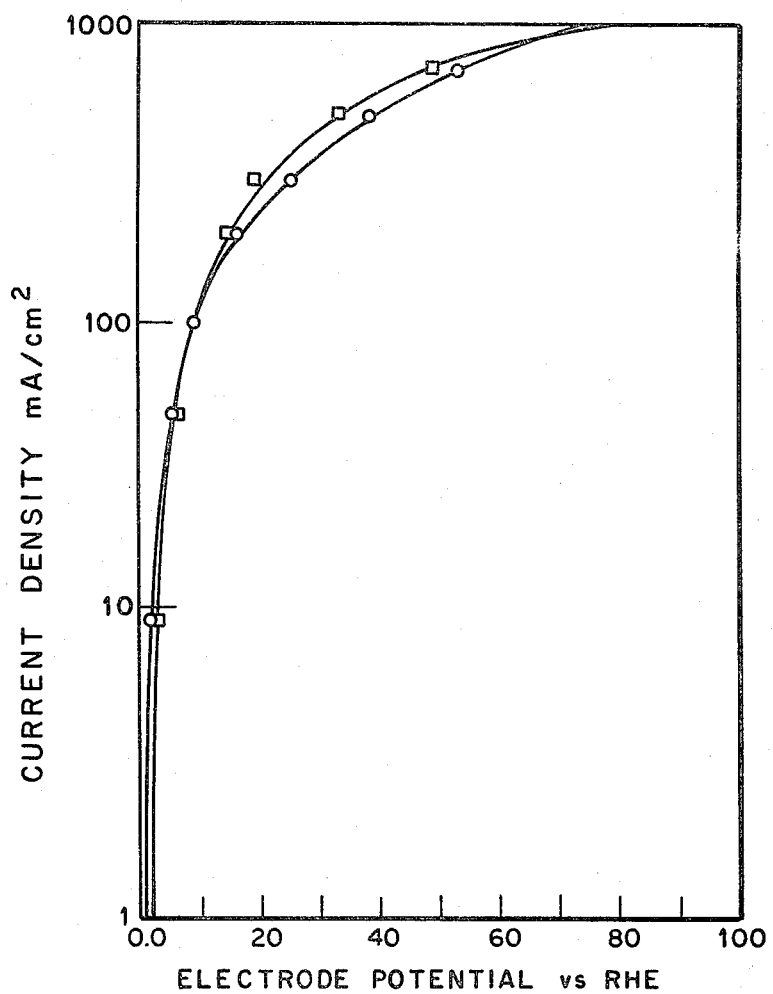
FIG. 2 is a plot diagram of anode performances for 0.5 mg Pt on carbon and 0.3 Pt-Pd on graphitized carbon in 901% $H_2$+10% CO 180° C. $H_3PO_3$ environment.
Figure 3:
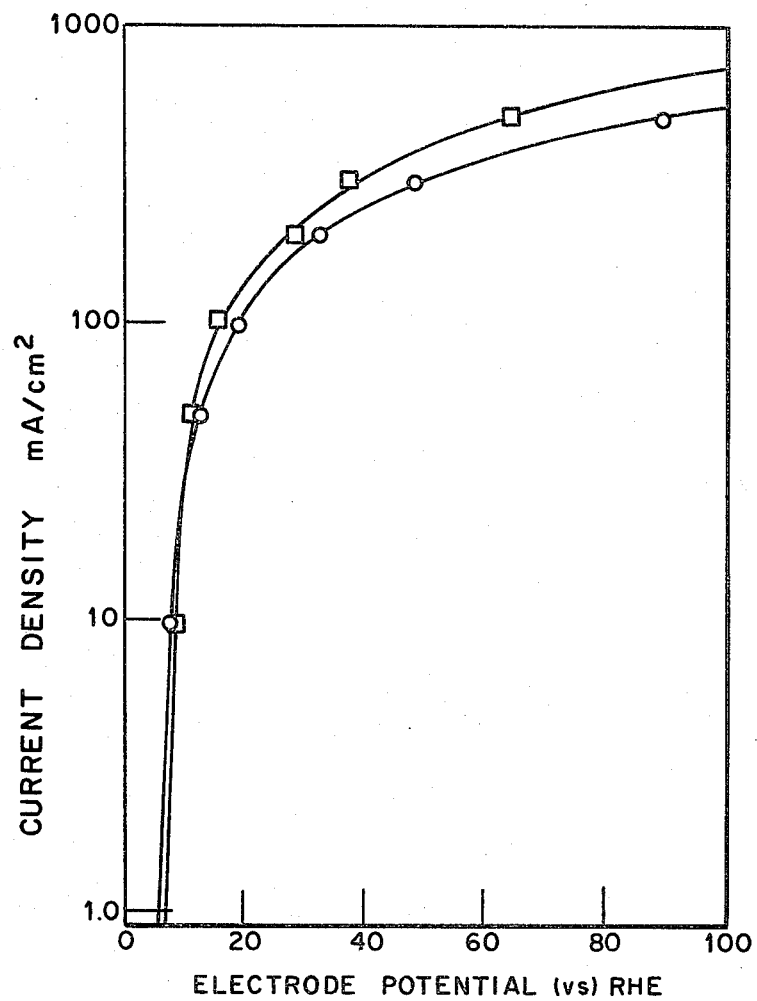
FIG. 3 is a plot diagram for 0.5 mg Pt on carbon and 0.3 mg Pd-Pt on graphitized carbon. Nominal 70% $H_2$+30% CO 180° C. and 100% $H_3PO_4$.

FIGS. 2 and 3 illustrate the excellent performance results of Pt/Pd alloy electrode of the present invention compared to conventional Pt electrodes. It should be noted that the Pt/Pd electrodes performed substantially the same as Pt electrodes even though the Pt/Pd loading was 0.3 mg/cm$^2$ versus 0.5 mg/cm$^2$ for Pt electrocatalyst.

Figure 4:
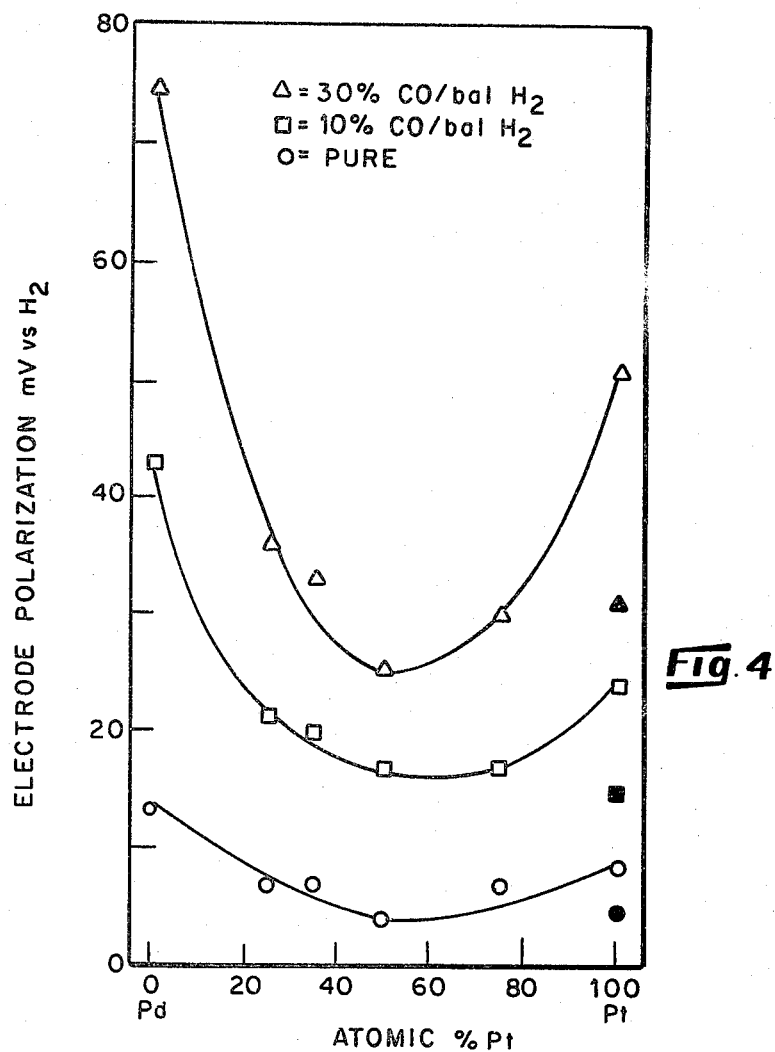
FIG. 4 is a plot diagram, comparing anode performance versus platinum-palladium electrocatlyst composition in 100% $H_3PO_4$ at 180° C.

FIG. 4 shows the performance criteria for Pt-Pd alloy electrodes operating at 200 mA/cm$^2$ and 180° C. Data are indicated in this figure for pure hydrogen, 10% CO/90% $H_2$, and 30% CO/70% $H_2$ gas mixtures. Due to electrocatalyst surface area loss during operation (often mistakenly called sintering) the electrocatalysts have been stabilized by a post-catalyzation heat treatment in nitrogen at 700° C. for 1 hour. It can be seen that the electrodes of the present invention have higher performances than pure platinum at a significantly lower cost. Based on these projections for the new electrocatalyst materials of the present invention we can conclude that we have achieved a substantial improvement over the prior art.

While not being limited to any particular theory it has been postulated that the graphitized or partially graphitized carbon support somehow facilitates the stability of the Pt/Pd electrocatalyst alloy under fuel cell operating conditions. The resulting stabilization of the Pt/Pd electrocatalyst material enables one to produce an electrode having good, if not, superior performance in comparison to Pt electrocatalyst material at significant economic savings.

The foregoing description of the preferred embodiments of the invention has been presented for purposes of illustration and description. It is not intended to be exhaustive or to limit the invention to the precise form disclosed, and obviously many modifications and variations are possible in light of the above disclosure. For example, the electrocatalyst material of the present invention can be used in fuel cells utilizing an alkaline electrolyte. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An electrochemical cell comprising: (1) a pair of electrodes separated by an electrolyte and (2) a fuel gas comprising about 10 to 30% CO wherein the improvement comprises having at least one of said electrodes consisting of a graphitized or partially graphitized carbon support having on the surface thereof, an electrocatalytic material consisting of a platinum-palladium alloy and a hydrophobic binder.

2. The cell of claim 1 wherein said platinum-palladium alloy comprises from about 20 to 65 weight percent palladium.

3. The cell of claim 2 wherein the metal loading in said electrode is in the range of about 0.1 to 0.5 mg/cm$^2$.

4. The cell of claim 1 wherein the total metal loading on said support comprises about 1 to 15 weight percent of the electrocatalyst.

5. The cell of claim 4 wherein the total metal loading on said support comprises about 2 to 10 weight percent of the catalyst material.

6. The cell of claim 1 wherein the metal loading in said electrode is in the range of about 0.1 to 0.5 mg/cm$^2$.

7. The cell of claim 1 wherein said hydrophobic polymer includes polytetrafluoroethylene.

8. The cell of claim 7 wherein said polymer is present in the range of about 25–60 weight percent.

9. The cell of claim 7 wherein said polymer is present in the amount of about 40 weight percent.

10. The cell of claim 8 wherein the metal to polymer ratio of the electrocatalytic material on said electrode is from 0.1 to 10 weight percent.

* * * * *